March 9, 1948. V. G. KLEIN ET AL 2,437,391
QUICK-ACTING VALVE MECHANISM FOR ACTUATING THE DISTRIBUTING
VALVE OF AN EXPANSIBLE CHAMBER MOTOR
Filed April 13, 1946 2 Sheets-Sheet 1

Victor G. Klein.
Rudy F. Schneller.
Inventors.
Haynes and Koenig,
Attorneys.

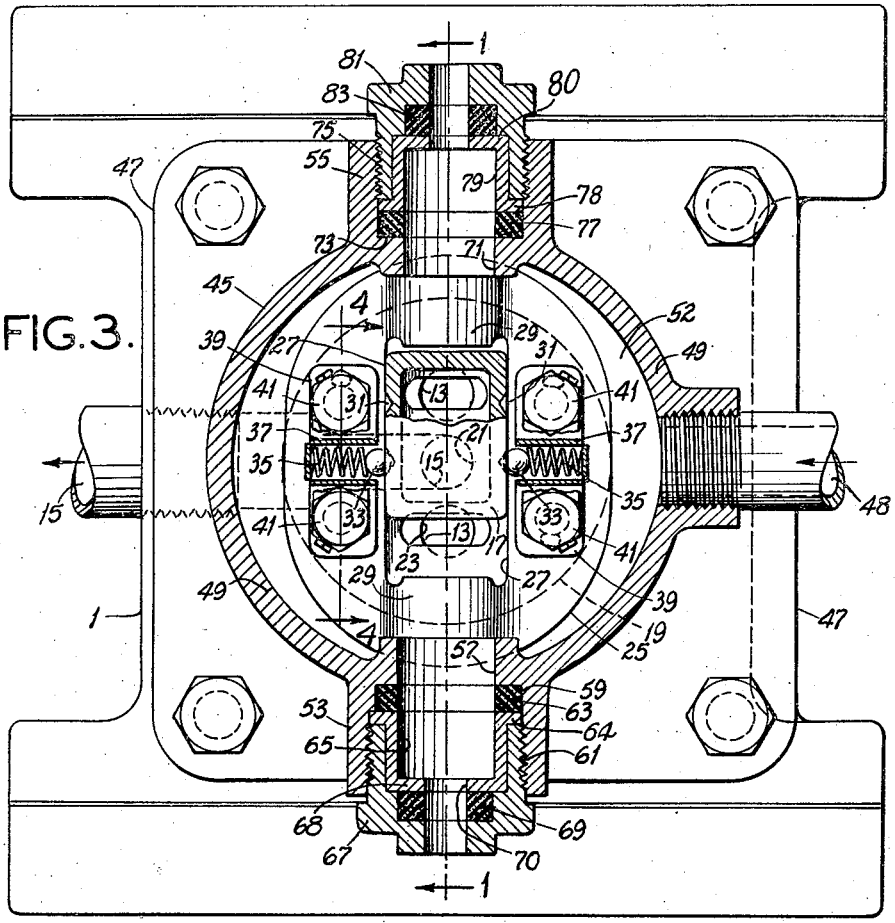
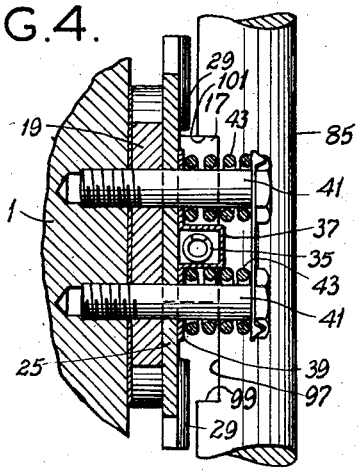

Patented Mar. 9, 1948

2,437,391

UNITED STATES PATENT OFFICE 2,437,391

QUICK-ACTING VALVE MECHANISM FOR ACTUATING THE DISTRIBUTING VALVE OF EXPANSIBLE CHAMBER MOTORS

Victor G. Klein and Rudy F. Schneller, St. Louis, Mo., assignors to Lincoln Engineering Company, St. Louis, Mo., a corporation of Missouri Application April 13, 1946, Serial No. 661,976

7 Claims. (Cl. 121—152)

This invention relates to valve mechanisms, and, more particularly, to actuating mechanisms for the distributing valves of fluid-operated reciprocating engines.

Among the several objects of the invention may be noted the provision of an improved distributing valve-actuating mechanism which functions to provide a desirable quick-acting cutoff or snap action of the valve at full engine stroke; the provision of such an actuating mechanism wherein snap action is attained without mechanical over-centering linkages or the like; the provision in a mechanism of the class described of an actuator utilizing the operating pressure fluid to effect the quick cutoff or snap action; and the provision of a valve-actuating mechanism of this class having few and simple parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section through the distributing valve and its actuating mechanism, and through part of the engine with which the valve is associated, being taken on line 1—1 of Fig. 3 and showing the valve in one position;

Fig. 3 is a section taken on line 3—3 of Fig. 1 but without the valve piston; and, Fig. 4 is a section taken on line 4—4 of Fig. 3 and illustrating certain details of the distributing valve assembly.

Similar reference characters indicate corresponding parts throughout the several views of the drawings.

Figure 1:
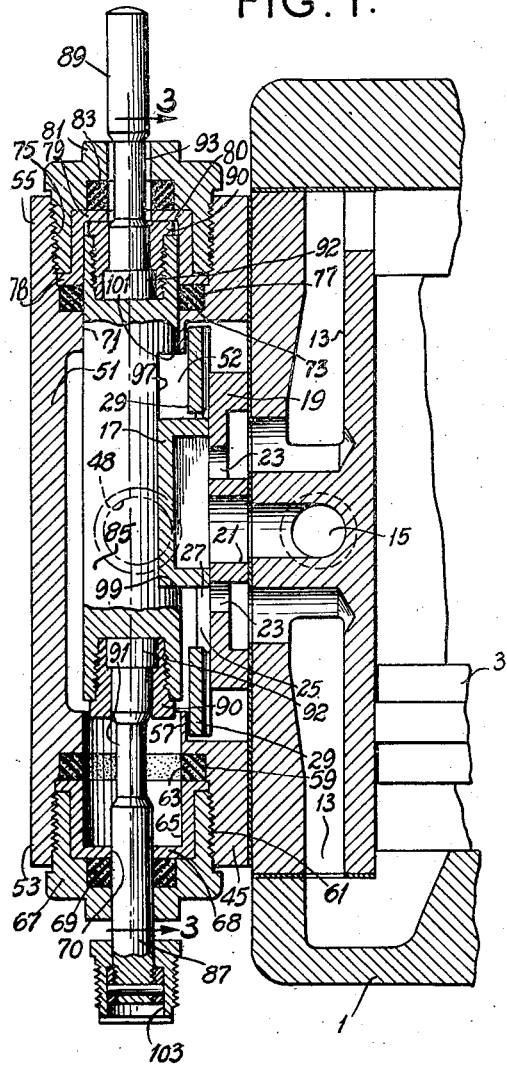

In United States Patents 2,215,852 and 2,269,423, dated September 24, 1940, and January 13, 1942, respectively, and in the copending application of Lutwin C. Rotter and Victor G. Klein, Serial No. 567,590, filed December 11, 1944 (matured as Patent 2,404,315, dated July 16, 1946), are shown reciprocating air engines and snap acting valve mechanisms for controlling engine supply and exhaust. This invention is an improvement upon the valve mechanisms of such apparatus and, more particularly, an improvement over the valve mechanism of said copending application. In said patents, the valve mechanism includes a mechanical over-centering linkage for operating the D-valve of the air engine with snap action at the end of a full stroke so as to provide a quick cutoff. This invention provides a valve mechanism having such snap action but eliminating the mechanical over-centering linkage, thereby accomplishing the same result with a simplified construction.

Referring now to the drawings, there is shown in part the cylinder 1 and piston 3 of an air engine which may drive a lubricant pump or the like. The cylinder is provided with the usual feed ports 13 and an exhaust port 15. A D-valve 17 cooperates with these ports and is adapted to connect either of the ports 13 with exhaust port 15 depending upon the position of the valve. This much of the apparatus corresponds to that shown in the aforesaid copending application.

The D-valve slides on a valve plate 19 having an exhaust port 21 (in communication with the engine exhaust port 15) and feed ports 23 (in communication with the engine feed ports 13). The D-valve is also disposed to slide in the rectangular central aperture of a guide and stop plate 25 having side portions 27 for longitudinally guiding the valve and raised bridge end portions or end stops 29 for limiting its stroke. The D-valve is formed with spaced detent notches 31 in each side adapted to receive detent balls 33. These balls are biased by springs 35 into engagement with the sides of the valve, and into the notches when the valve is in one or the other of its distributing positions. The springs and balls are retained in channels or pockets 37 stamped out of retaining plates 39. The notches 31 are spaced to latch the D-valve in one or the other of its distributing positions. The detents prevent rebound of the D-valve from one or the other of end stops 29 when the valve is operating at high speed. The plates 19, 25 and 39 are held in place by headed studs 41 passing loosely through apertures in the plates and threaded into the engine cylinder. Springs 43 reacting between the heads of the studs and the plates resiliently hold in place the plate assembly.

This D-valve assembly is enclosed within a casing 45 having a flange plate 47 attached to the engine cylinder 1 in air-tight relation. Casing 45 functions as an air chest for the operating air pressure, which is supplied through inlet 48. The casing comprises a cylindrical wall 49 and a cover portion 51 forming a pressure chamber 52 intermediate diametrically opposed bosses 53 and 55. The lower boss 53 is provided with a bore 57 in which is a pocket 59 and a threaded part 61. A packing 63 is disposed in pocket 59 and is retained by the outer rim 64 of a hat member or thimble 65 and a gland 67 threaded in bore 61. The interior of the hat member or thimble forms a cylindrical continuation of bore 57. The gland is formed with a pocket in which is disposed a packing 69 retained therein by the crown 68 of the hat member 65. An opening 70 is provided in the crown 68. The upper boss 55 is also provided with a bore 71, coaxial with the lower bore 57, a pocket 73, and a threaded bore 75. A packing 77 is disposed in pocket 73 and is retained therein by the outer rim 78 of a thimble or hat member 79 and a gland 81 threaded in counterbore 75. The interior of this thimble forms a continuation of bore 71. Gland 81 is formed with a pocket in which is disposed a packing 83 retained therein by the end crown 80 of thimble 79.

Figure 2:
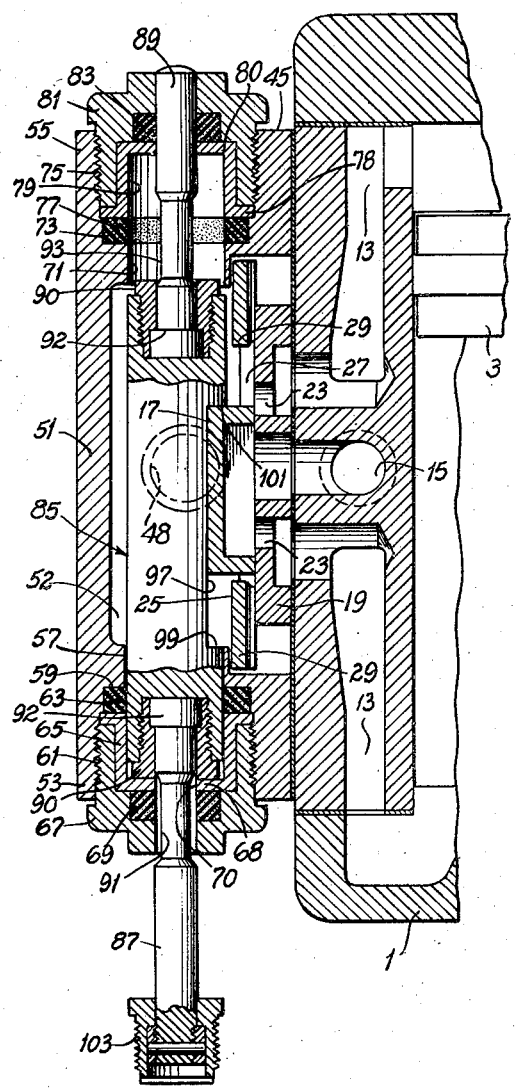
Fig. 2 is a section similar to Fig. 1 but illustrating the valve in another position.

A double-ended piston 85 disposed within casing 45 is adapted to reciprocate therein from one of bores 57 or 71 to the other (see Figs. 1 and 2). This piston has a loose enough fit in these bores to permit passage of air between the bore and piston walls except when the appropriate end of the piston is disposed within the packing 63 or 77. When an end of a piston is disposed within a packing, however, as, for example, when the lower end of the piston 85 is disposed within packing 63, the packing seals the clearance between the lower end of the piston and bore 57 and prevents the escape of air from chamber 52.

A stem 87 extends from the lower end of the piston 85 through thimble 65, packing 69, and gland 67. A similar but shorter stem 89 extends from the other end of the piston through the thimble 79, packing 83 and gland 81. Stem 87 acts as an operating stem. Each stem is secured in its respective end of the piston by a collar 90 threaded into the end of the piston into engagement with a flange 92 on the stem. Sufficient clearance is provided between each stem and its collar to permit radial adaptations of the stems for alignment with the apertures in the glands.

Stems 87 and 89 have annular grooves 91 and 93, respectively, formed therein providing reduced portions adjacent the opposite ends of the piston 85. The stems 87 and 89 have loose fits (of the order of .001 inch) in their respective glands and thimbles, but they have leak-proof fits in the packings 69 and 83. When the stems are disposed in these packings, the packings seal upon the stems and prevent the escape of air. When the grooves 91 and 93 are disposed within the respective packings, air may escape freely.

Each stem thus cooperates with the respective packing 69 or 83 to provide a valve. Stem 87 functions to cut off escape of air from the air chest through gland 67 when the lower end of piston 85 is withdrawn from packing 63 (Fig. 1), and to permit escape of air (through groove 91) from ahead of the lower end of the piston when it moves downward into packing 63 (Fig. 2). Stem 89 functions to cut off escape of air from the air chest through gland 81 when the upper end of the piston is withdrawn from packing 77 (Fig. 2) and to permit escape of air (through groove 93) from ahead of the piston when it moves upward into packing 77 (Fig. 1).

The effective sealing length of piston 85 is slightly longer than the distance between the packings 63 and 77 so that when one end of the piston moves into a packing, the other end is not quite withdrawn from the other packing. For example, when the upper end of the piston moves into packing 77, its lower end is just being withdrawn from packing 63. The ends of the piston 85 thus function as valves with some so-called "lap." Each boss 53 or 55 is a ported means. The bore provides a port between the corresponding end of the piston and the bore to admit air from chamber 52 into the bore behind the end of the piston when it is withdrawn from the packing therein.

The upper portion of the D-valve is received with lost motion in a notch 97 in the piston 85. This notch is longer than the D-valve and its shoulders 99 and 101 provide a lost-motion connection between the piston and the D-valve.

The operating stem 87 is provided at its lower end with a clevis 103 for connection to a valve gear of the type shown in the aforesaid Patent 2,404,315. This valve gear is adapted to move piston 85 up when piston 3 nears the lower limit of its stroke, and to move the piston 85 down when piston 3 nears the upper limit of its stroke.

The operation of the valve mechanism is as follows:

Assume that the piston 3 of the reciprocating engine is beginning an upward stroke. The parts are then disposed in the position shown in Fig. 1. The valve piston 85 is at this time at the upper limit of its stroke. The groove 93 in the stem 89 is in the upper gland 81 and packing 83, but free from them. The upper end of piston 85 is within the packing 77 so that this packing seals against the piston and prevents the escape of air between the upper end of the piston 85 and bore 71. The lower end of piston 85 is withdrawn from lower bore 57, but operating stem 87 is disposed in the lower packing 69 to provide a seal to prevent the escape of air from the chamber 52. The D-valve 17 has been moved by the shoulder 99 into position to establish communication from the chamber to the lower feed port 13 of the engine (through port 23) and from its upper feed port 13 through upper port 23 to the exhaust 15 through port 21.

Only after the piston 3 nears the end of its stroke, the valve gear (not shown herein but in Patent 2,404,315) functions to move the operating stem 87 and piston 85 downward. The D-valve remains in the Fig. 1 position, being retained therein by the detent balls 33, until it is later engaged by the upper shoulder 101. At some stage the upper end of the piston 85 has just cleared the packing 77 and stem 89 has entered the packing 83. This permits compressed air to pass from chamber 52 between the bore 71 and the upper end of the piston and into the space above the piston. The seal provided by packing 83 and stem 89 retains this air in the space. Also, at this point, the lower end of the piston 85 has entered the packing 63 and the groove 91 has entered the packing 69 to release air pressure from beneath piston 85. Consequently, the air pressure on the upper end of piston 85 drives it rapidly downward to drive the D-valve with quick or snap action to its other distributing position illustrated in Fig. 2. Air under the lower end of the piston is freely exhausted through the groove 91. With the D-valve in the Fig. 2 position, communication is established for connecting air pressure from the air chest 45 (plenum chamber 52) to the upper feed port 13 of the engine through port 23 and from the lower port 13 through lower port 23 to the exhaust 15, and the piston 3 is forced downward. When piston 3 nears the lower limit of its stroke, the valve gear operates to move operating stem 87 and piston 85 upward and the D-valve is snapped back to the Fig. 1 position in the same manner as heretofore described, the operations at opposite ends being, however, reversed.

Thus, the valve mechanism functions to actuate the D-valve with a snap action to provide quick cutoff at substantially full engine stroke. The piston member 85 is actuated over part of its stroke by a lost-motion mechanical linkage between the piston rod of the engine and operating stem 87. This linkage is not shown or described herein since it does not form a part of this invention and is particularly disclosed in the aforesaid Patent 2,404,315. The piston member 85 is actuated over the remainder of its stroke by the operating air pressure. During this latter part of its stroke, it actuates the D-valve. The valve mechanism does not include any mechanical over-centering linkage and, in effect, includes only one moving part—the piston member 85 and stems 87 and 89. This improved construction makes the mechanism simple to construct and maintain and reduces wear.

It will be understood that the valve mechanism is not limited in application to an air-operated engine. It may be applied to an engine operated by other pressure fluids.

A novel feature is the holding of the pairs of packings, such as 63 and 69 for example. One of these (63) is large enough to accommodate the piston 85; and the other (69) is small enough to accommodate the smaller piston constituted by the stem 87. By counterboring both of the members 53 and 67 and placing the respective packings at the bases of the counterbores and providing the hat-shaped member 65, both packings may readily be held in position, although only a single threaded connection is used between the members 53 and 67, for example.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In apparatus of the character described, a casing formed to provide a chamber for fluid pressure intermediate longitudinally spaced bores, each of said bores opening into said chamber, a double-ended piston reciprocable in said casing and having its ends slidable in said bores, said ends having a sufficiently loose fit in said bores to permit passage of fluid therebetween, a packing in each bore adapted to engage the end of the piston therein in fluid-tight relation when said end is moved into said packing, the length of said piston and the spacing of said packings being such that when one end of the piston is withdrawn from the packing in one bore, the other end of the piston is moved into the packing in the other bore, whereby fluid pressure from the casing is admitted to said one bore and cut off from the other.

2. In apparatus of the character described, a casing formed to provide a chamber for fluid pressure intermediate longitudinally spaced bores, each of said bores opening into said chamber, a double-ended piston reciprocable in said casing and having its ends slidable in said bores, said ends having a sufficiently loose fit in said bores to permit passage of fluid therebetween, a packing in each bore adapted to engage the end of the piston therein in fluid-tight relation when said end is moved into said packing, the length of said piston and the spacing of said packings being such that when one end of the piston is withdrawn from the packing in one bore, the other end of the piston is moved into the packing in the other bore, whereby fluid pressure from the casing is admitted to said one bore and cut off from the other, and means including valves movable with said piston adapted to cut off escape of fluid pressure from said one bore while venting said other bore to exhaust.

3. A valve mechanism for actuating the distributing valve of a fluid-operated reciprocating engine, comprising a casing formed to provide a pressure chamber intermediate longitudinally spaced bores, each bore being in fluid communication with said chamber, a piston reciprocable in said casing having its ends slidable in said bores, a packing in each bore adapted to effect a fluid seal upon the end of the piston therein, said packings being spaced a distance less than the length of said piston, a gland in each bore retaining the packing therein, an operating stem extending from one end of the piston through the related gland, a stem extending from the other end of the piston through the other gland, each stem having a reduced portion adjacent the respective end of the piston, and a packing in each gland adapted to effect a fluid seal upon the unreduced portion of the stem therein.

4. A reciprocating means for operating a valve member in a fluid pressure chest, comprising opposite coaxial recesses in the chest having coaxial outlets, coaxial seals associated with the recesses and outlets, a double-ended piston reciprocating between said recesses and adapted to have one end enter one sealed recess while having its other end emerge from the other sealed recess, and coaxial valve means extending from opposite ends of said piston respectively passing through said outlets for alternately opening and closing them, the valve means on a given end of said piston closing its outlet when the adjacent end of said piston emerges from its recess and adapted to open said outlet when said adjacent end enters said recess.

5. A reciprocating means for operating a valve member in a fluid pressure chest, comprising opposite coaxial recesses in the chest having coaxial outlets of smaller sizes than the recesses, seals associated with the recesses and outlets, a double-ended piston reciprocating between said recesses and adapted to have one end enter one sealed recess while having its other end emerge from the other sealed recess, and extending coaxial valve means of reduced size extending from opposite ends of said piston respectively passing through said outlets and being grooved for alternately opening and closing the outlets, the valve means of a given end of said piston closing its outlet when said piston end emerges from its recess and adapted to open said outlet when said end enters said recess.

6. In apparatus of the class described, stepped cylinder means for accommodating stepped piston means comprising a member having a counterbore, a ring packing in the base of said counterbore, a hat-shaped member in the counterbore, said hat-shaped member forming a cylinder and having an outer rim seating on said packing and having a crown including an opening, a member threaded into the counterbore around said hat-shaped member, said threaded member having an opening and a counterbore, and a second packing in the last-mentioned counterbore which is held by the crown of said hat-shaped member.

7. In a valve-operating mechanism, a pressure-containing chest, opposite cup-shaped recesses in said chest, a piston having opposite ends fitting into said opposite recesses and of a length such that when one end is in one recess the other end is withdrawn from the other recess, said recesses having coaxial valve outlets, coaxial recessed valve stems extending respectively from opposite ends of the piston and passing through said outlets, the recess on one valve stem being adapted to open its outlet when the adjacent piston end is in the adjacent recess and to close said outlet when said adjacent piston end recedes from said adjacent recess, the opposite piston ends and valves operating inversely as the piston reciprocates, and self-aligning means connecting the valves with the respective piston ends.

VICTOR G. KLEIN.
RUDY F. SCHNELLER.

REFERENCES CITED

The following references are of record in the file of this patent:

UNITED STATES PATENTS

| Number | Name | Date |
|---|---|---|
| 368,649 | Carpenter | Aug. 23, 1887 |
| 380,888 | Hanscom | Apr. 10, 1888 |